United States Patent
Luck et al.

(10) Patent No.: US 12,449,359 B1
(45) Date of Patent: Oct. 21, 2025

(54) PROPERTY ANALYSIS USING SENSORS

(71) Applicant: United Services Automobile Association (USAA), San Antonio, TX (US)

(72) Inventors: Gideon Bowie Luck, Wylie, TX (US); Stacy Callaway Huggar, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 592 days.

(21) Appl. No.: 17/353,370

(22) Filed: Jun. 21, 2021

(51) Int. Cl.
G01N 21/64 (2006.01)

(52) U.S. Cl.
CPC ..... G01N 21/6404 (2013.01); G01N 21/6408 (2013.01)

(58) Field of Classification Search
CPC ................ G01N 21/6404; G01N 21/6408
See application file for complete search history.

(56) References Cited

U.S. PATENT DOCUMENTS

| | | | |
|---|---|---|---|
| 11,075,766 B1 * | 7/2021 | Norton | H04L 9/0819 |
| 11,797,836 B1 * | 10/2023 | Evans | G01S 17/931 |
| 2008/0156993 A1 * | 7/2008 | Weinberg | G01T 1/1615 |
| | | | 250/370.06 |
| 2008/0245654 A1 * | 10/2008 | Young | B01J 19/10 |
| | | | 204/157.5 |
| 2015/0009490 A1 * | 1/2015 | Poteet | G01N 21/64 |
| | | | 356/73 |
| 2016/0002620 A1 * | 1/2016 | Montagnier | C12Q 1/6886 |
| | | | 435/283.1 |
| 2021/0004707 A1 * | 1/2021 | Gambetta | G06N 20/00 |

OTHER PUBLICATIONS

Gaynor Selby, "Blockchain technology: Increasing trust, traceability & security in the food industry", Feb. 20, 2018 downloaded https://www.foodingredientsfirst.com/news/blockchain-technology-increasing-trust-traceability-security-in-the-food-industry.html Dec. 14, 2023 (Year: 2018).*
Wikipedia: Quantum Sensor, https://en.wikipedia.org/wiki/Quantum_sensor (Year: 2023).*
Ivey et al., "Detection and identification of microorganisms in wine: a review of molecular techniques" J. Industrial Microbiol. Biotech., Oct. 2011, 38(10):1619-34.
licor.com [online], "Sensor Design" 2021, retrieved on May 10, 2021, retrieved from URL <https://www.licor.com/env/products/light/science,> , 3 pages.

* cited by examiner

Primary Examiner — Mohammad K Islam
(74) Attorney, Agent, or Firm — Fish & Richardson P.C.

(57) ABSTRACT

Methods, systems, and apparatus, including computer programs encoded on a computer storage medium, for valuing and or authenticating property. An example system includes a sensor system and a computer system. The sensor system includes one or quantum sensors, and is configured to generate first sensor data representing one or more molecular properties of a first object at a first time. The computer system is configured, at least, to: receive the first sensor data from the sensor system; obtain model data representing one or more molecular properties of a model object; generate, based on the first sensor data and the model data, a comparison between the one or more molecular properties of the first object at the first time and the one or more molecular properties of the model object; and determine an authenticity of the first object based on the comparison.

16 Claims, 8 Drawing Sheets

PROPERTY ANALYSIS USING SENSORS

TECHNICAL FIELD

The present specification relates to analysis of property using quantum sensors.

BACKGROUND

Quantum sensors provide extremely accurate measurements of photonic radiation such as visible light and x-rays. Quantum sensors can measure single photons to perform extremely precise measurements of radiation emitted from or reflected by an object. Quantum sensors have been applied to metrology in fields such as microscopy, positioning systems, and electric or magnetic field sensors.

SUMMARY

This specification describes technologies for analyzing valuable property using quantum sensors. These technologies generally involve verifying the quality, authenticity, and/or identity of valuable property (e.g., precious metals, gemstones, wine, liquor, art) using quantum sensors. The quantum sensors provide highly accurate measurements of the property which are used to develop molecular level models of the property. The authenticity and quality of the property can be evaluated based on comparisons with ground truth molecular modes of similar types of property. For instance, quantum sensor measurements of precious metals (e.g., jewelry or coins) can be compared to molecular models of varying purities of the metal to confirm authenticity and the purity or quality of the subject metal. Once analyzed, a molecular signature of the property can be stored to serve as a basis for identification of the property in the future.

The subject matter described in this specification can be implemented in particular embodiments so as to realize one or more of the following advantages. Implementations may improve the grading precision for certain types of property such as jewelry, gemstones, and precious metals. Implementations may increase the accuracy of verifying authenticity for more complex types of property such as fine wines and liquors by evaluation at the molecular level. Furthermore, there would be no need to open the bottles to test the content, as quantum sensor analysis could be performed through the bottle.

The details of one or more embodiments of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for conducting precise analysis of objects using quantum sensors. Specifically, the present disclosure provides a system and method for evaluating authenticity, quality, or identity of objects based on a molecular makeup of the object as determined through the use of quantum sensors. The quantum sensors generate precise measurements of radiation emitted by or reflected by an object. The system creates a model of the object using the quantum sensor measurements. Authenticity and/or quality of the object can be estimated by comparison of the measure quantum sensor data to a standardized model of the object. For instance, quantum sensor measurements of a purported 24-karat gold coin can be compared to predetermined standard for known 24-karat gold. Object identity can be verified by comparison of quantum sensor measurements by storing a set of quantum sensor measurements as a "molecular signature" for the object. The identity can then be verified at a later date by comparing new measurements of the purported object with the object's previously obtained quantum measurements (e.g., the "molecular signature" of the object).

Implementations of the present disclosure will be discussed in further detail with reference to an example context, however, it should be appreciated that the implementations disclosed may be applicable more generally to any analysis of many types of objects for many different purposes. The example context includes analyzing an object of valuable property. For example, the system can be used to verify authenticity, quality, or identity of various types of valuable property. Such property can include, but are not limited to, jewelry, gemstones, precious metals, art, collectables, clothing, high value textiles (e.g., tapestries), and/or high value beverages such as wines and liquors.

Figure 1A:
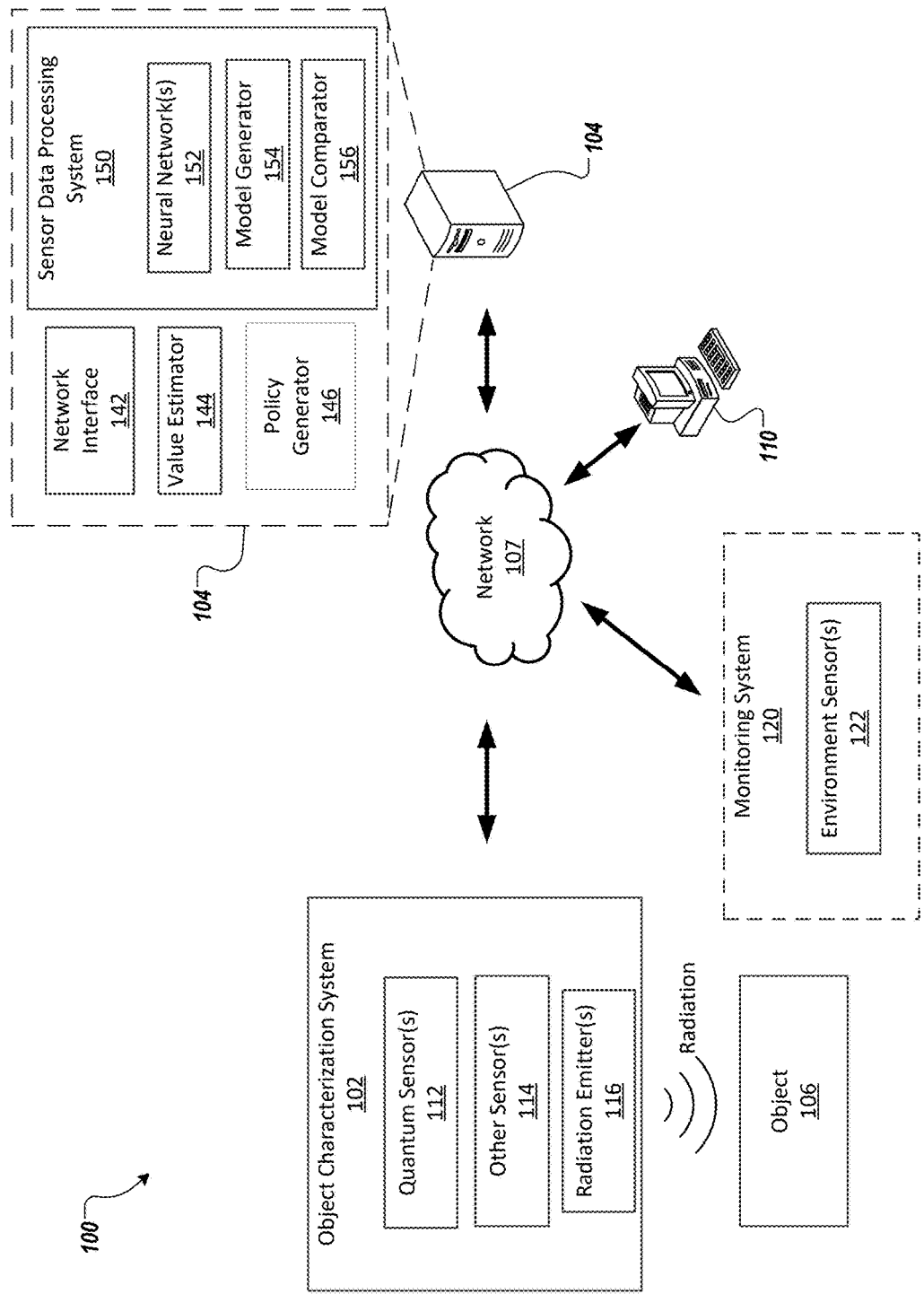
FIG. 1A is a diagram of an example system for analyzing objects with quantum sensors.

FIG. 1A is a diagram of an example system 100 for analyzing objects with quantum sensors. The system 100 includes an object characterization system (OCS) 102, a sensor processing server system 104, one or more user computing devices 110, and, optionally, an asset monitoring system (AMS) 120. The OCS 102, server system 104, computing devices 110, and AMS are in communication through one or more networks 107. The network(s) 107 can include a large network or combination of networks, such as a PSTN, a local area network (LAN), wide area network (WAN), the Internet, a cellular network, a satellite network, one or more wireless access points, or a combination thereof connecting any number of mobile clients, fixed clients, and servers. In some examples, the network 107 can be referred to as an upper-level network.

The user computing device 110 can be any commercially available computing devices having a user interface for input and output, and capable of network communication. For example, the user computing device 110 can include, but is not limited to, a desktop computer, a laptop computer, a tablet computer, or a smartphone.

The OCS 102 includes a system or array of one or more quantum sensors 112 and optionally additional other (e.g., non-quantum) sensors 114 and radiation emitter(s) 116. The quantum sensors 112 can include multiple groups of sensors. The groups of quantum sensors 112 can each include quantum sensors 112 that are tuned to measure electromagnetic radiation (e.g., visible light, X-rays, ultraviolet light) within a predetermined band. For example, one group may be configured to measure X-ray radiation and another group may be configured to measure visible light.

The radiation emitters 116 are configured to emit electromagnetic radiation (e.g., visible light, X-rays, ultraviolet light) toward an object 106. The OCS 102 can include multiple radiation emitters 116 each tuned to emit a different band of electromagnetic radiation. The frequency bands of each radiation emitter 116 may be overlapping or non-overlapping with frequency bands of other radiation emitters 116. The radiation interacts with the object 106 and is measured by the quantum sensors 112. For example, the radiation interacts with the object by reflection, refraction, absorption, or a combination thereof. In some instances, the radiation may be absorbed by the object or may interact with particles (e.g., molecules and/or atoms in the object) causing the particles to emit radiation. Thus, the particles within the object 106 can be characterized by the interactions with the radiation. For instance, quantum sensors 112 can be positioned in an array around the object 106 to detect radiation reflections and refraction from multiple angles.

The other, non-quantum sensors 114 can include non-quantum light or X-ray sensors. For example, the other sensors 114 can be used to measure background radiation noise within the environment. Background measurements can be used to cancel noise from the quantum sensor signals.

Figure 1B:
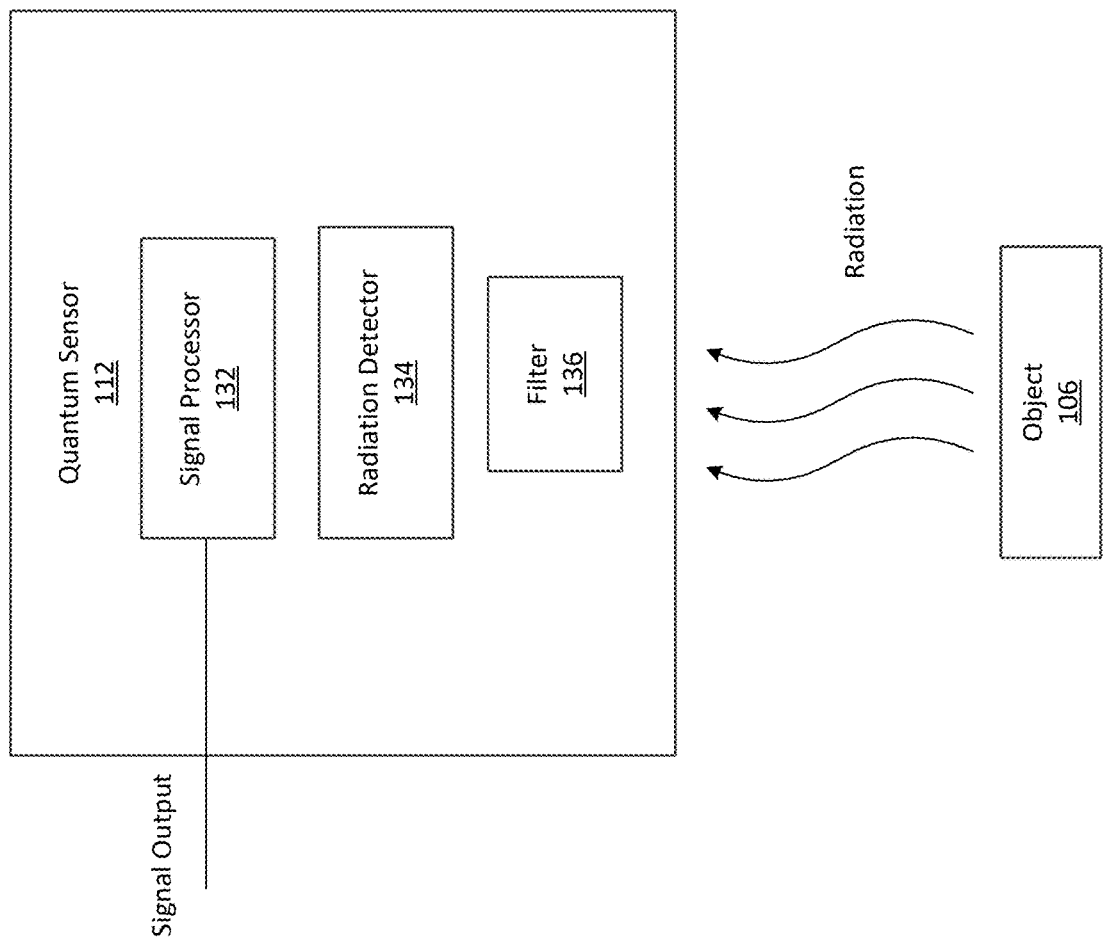
FIG. 1B is a diagram of an example quantum sensor based system.

Referring to FIGS. 1A and 1B, an exemplary quantum sensor 112 includes a signal processor 132, a radiation detector 134 and a filter 136. In operation the quantum sensor 112 is configured to measure electromagnetic radiation with high precision. For example, quantum sensors 112 can detect single photons across a spectrum of electromagnetic radiation. The radiation detector 134 is configured to detect radiation emitted by or reflected from an object 106. The filter 136 filters electrical signals received from the radiation detector 134 that are representative of electromagnetic radiation measured by the radiation detector 134. The signal processor 132 process the filtered electrical signals received from the radiation detector 134. The signal processor 132 generates a sensor output signal indicating the intensity and frequency of the detected electromagnetic radiation. For example, the output signal may indicate a number of photons of a given wavelength measured by the sensors. For instance, the processor may "count" a number of photons detected by the sensor over time and segregate the counts into different frequency bins across a spectrum of frequencies detectable by the detector 134. The output signal may indicate a raw count over a time segment or a measure of intensity over the time segment (e.g., in lm/sr or $W/m^2$). In some implementations, the signal processor 132 can determine a spectral composition of the measured radiation. For example, the signal processor 132 can perform frequency analysis (e.g., FFT analysis) on the detector signals to determine frequency content of the signals.

The AMS 120 includes environment sensors 122 configured to monitor an environment in which the object 106 is stored or displayed. Environment sensors 122 can include, but are not limited, to light sensors, humidity sensors, temperature sensors, and/or air pollution sensors. For example, the AMS 120 can be employed, in some implementations, to monitor the storage of the valuable property assets after an initial authenticity and/or quality analysis has been performed using OCS 102 to monitor for proper storage conditions. If the AMS 120 detects improper storage conditions, e.g., a period of excess temperature that would adversely affect a high value bottle of wine or a period of high humidity that would adversely affect fine artwork, a subsequent quality analysis can be performed to identify any damage to the property.

The server system 104 may be hosted within a data center, which can be a distributed computing system having many computers in one or more locations. The server system 104 includes a network interface 142, a value estimator 144, an optional policy generator 146, and a sensor data processing system (SDPS) 150. The SDPS 150 includes one or more neural networks 152, a model generator 154, and a model comparator 156.

Figure 6:
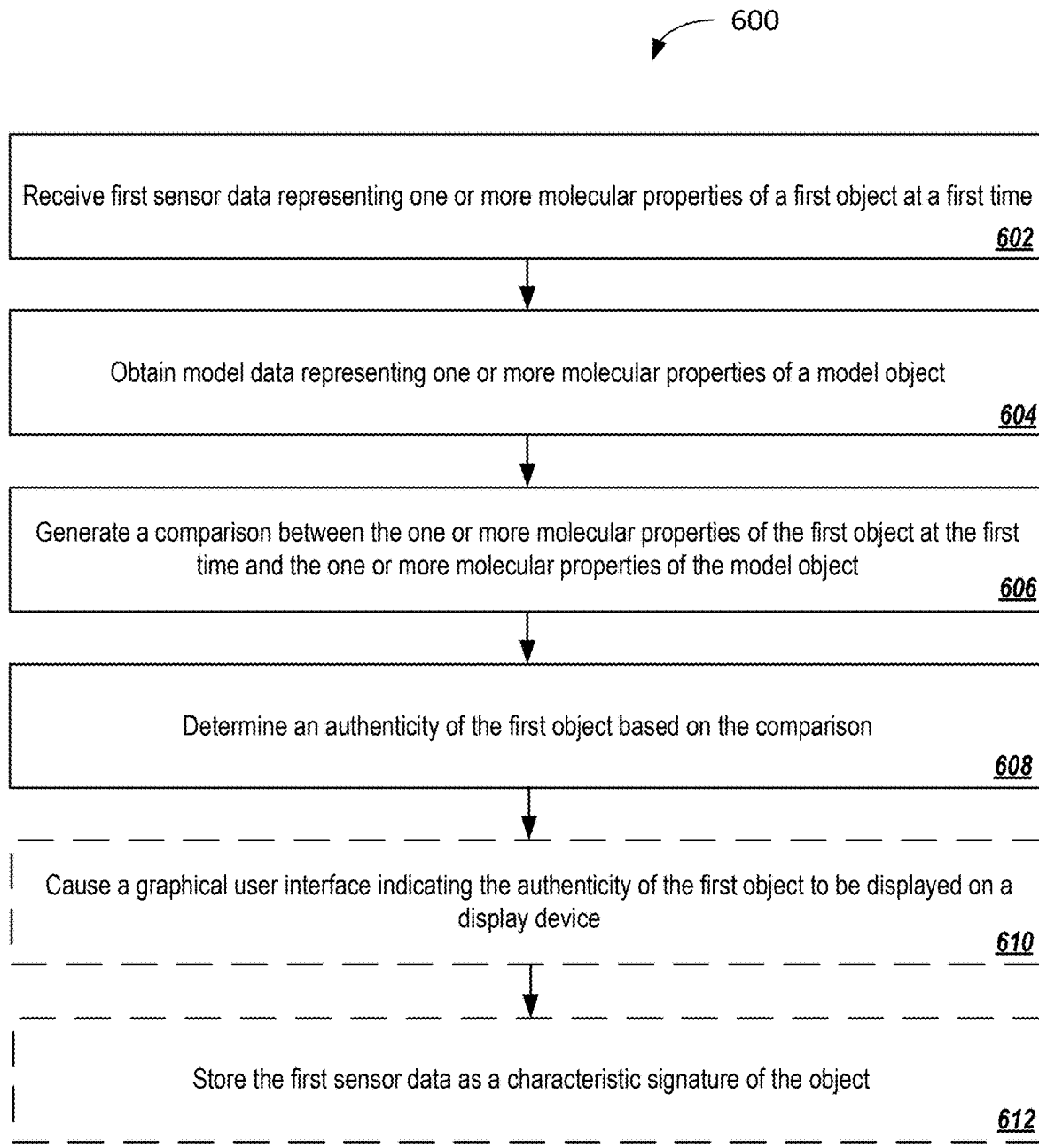
FIG. 6 depicts a flow diagram of an example process for analyzing an object using quantum sensors in accordance with implementations of the present disclosure.

The system 100 can perform a process for conducting precise analyses of objects 106 based on quantum sensor data. For example, the system 100 can perform authentication and/or identification of valuable objects including, but not limited to, jewelry, gemstones, precious metals, art, collectables, clothing (e.g., furs), and/or high value beverages such as wines and liquors. FIG. 6 is a flow diagram of an example process 600 that can be performed by the system 100. Briefly, process 600 includes receiving first sensor data representing one or more molecular properties of a first object at a first time (602), obtaining model data representing one or more molecular properties of a model object (604), generate a comparison between the one or more molecular properties of the first object at the first time and the one or more molecular properties of the model object (606), determining an authenticity of the first object based on the comparison (608), and, optionally, causing a graphical user interface indicating the authenticity of the first object to be displayed on a display device (610) and/or optionally storing the first sensor data as a characteristic signature of the object (612). The process 600 can be performed by a computing system including one or more computers, such as the server system 104.

The components and modules of the server system 104 can each be provided as one or more computer executable software modules or hardware modules. That is, some or all of the functions of value estimator 144, optional policy generator 146, SDPS 150, neural networks 152, model generator 154, and model comparator 156 can be provided as a block of computer code, which upon execution by a processor, causes the processor to perform functions described below. Some or all of the functions of the server system 104 can be implemented in electronic circuitry, e.g., by individual computer systems (e.g., servers), processors, microcontrollers, a field programmable gate array (FPGA), or an application specific integrated circuit (ASIC).

The server system 104 can receive sensor data from the OCS 102 through the network interface 142. For example, the OCS 102 can perform one or more of a series of radiation measurements on an object 106 to characterize the molecular properties of the object and send the sensor data to the server system 104. The sensor data includes measurements made by the quantum sensors 112 and represents molecular properties of the object. Such molecular properties can include, but are not limited to, at least one of a molecular composition of the object 106 and a crystal structure of the object. For example, radiation from the absorption and emission patterns of the object 106 can indicate the molecular and/or atomic makeup of the object 106. For instance, if a gold coin is analyzed the absorption and emission patterns of the object 106 can indicate the purity of the gold. That is, how much gold is contained in the coin compared with other metals or impurities. As another example, the reflected and refracted radiation patterns and indicate a crystalline structure of the object. For instance, if a gemstone is analyzed an X-ray reflection/refraction pattern may be used to indicate a crystal structure of the gemstone. The data may be processed, as described below, to map the crystal structure and identify defects (e.g., inclusions) in the structure that are not readily visible to the naked eye.

In some implementations, the sensor data can be tagged (e.g., by the OCS 102) to indicate measurement characteristics associated with each segment of data. For example, data tags may indicate the position of the quantum sensor 112 that received the data weight respect to a direction of radiation illumination on the object to aid in identifying the data as reflected or refracted signals. The data tags may indicate a spectral frequency, and or time of radiation emitted by the radiation emitter during the measurements and the time of radiation detection by the sensor 112, e.g., to aid in determining whether the measured signals are reflections or emissions from the object 106.

In some implementations, the server system 104 can generate an initial model of the object 106 from the sensor data. For example, the model generator 154 is configured to process the sensor data into an initial model of the molecular properties of the object 106. An object model can be, for example, a data structure containing the quantum measurements of the object from various angles, positions, and radiation illumination patters; spectroscopy measurements (e.g., absorption and emission patterns from the object) at different radiation illumination patterns; and/or crystallography patterns indicating portions of a crystal structure of the object 106. The radiation illumination patterns can include different types of radiation (e.g., visible light, UV light, or X-rays). For example, the object model may indicate the types and amount of different elements and molecules measured in the object 106 by the OCS 102, indications of any defects in the object's 106 molecular or crystal structure. In some implementations, the object model can be a data structure describing the molecular composition and/or the crystal structure of the object 106. In some implementations, the object model includes a mapping of the molecular composition and/or the crystal structure of the object 106 at a plurality of different locations on the object 106.

The model generator 154 generate the object model by, e.g., comparing the sensor data to known radiation patterns (e.g., spectroscopy patterns) of different elements/molecules to identify the types and amount of different elements/ molecules in the object 106. For example, the model generator 154 can use the spectral composition of the sensor data to determine the molecular or elemental components of the object 102 based on a library of known radiation patterns for various molecules and elements. In some implementations, the model generator can process the sensor data to identify the crystal structure of the object and map defects within the object. For example, X-ray crystallography techniques can be used to identify a crystal structure of the object 106 based on reflection and refraction of X-rays with the object 106. The object model may represent unique characteristics of the object and serve as a "molecular signature" that uniquely identifies the object. In some implementations, the model generator 154 can employ a neural network 152 to generate the object model.

The server system 104 can verify authenticity and/or quality of the object 106 by comparing the sensor data of the object 106 to an object model of a verified object. For example, the server system 104 can obtain a model of a verified object or a set of objects from a database of verified object models. The database may contain a set of verified object models for different types of objects. For instance, the database may contain a set of verified object models for different purities of gold: a 24-karat gold model, an 18-karat gold model, etc. Each verified gold object model represents expected molecular characteristics for a particular purity of gold. In some implementations, the database can include verified object models that represent different types of beverages, e.g., wines or liquors. Such beverage object models may indicate an expected molecular structure of a particular beverage at a given age. For example, verified wine models may indicate expected amounts of alcohol, tannins, sugars, acids, minerals, oxygen, and yeast in the wine at a particular point in the aging process for a particular type of wine.

The model comparator 156 is configured to compare the sensor data from measurements performed on the object 106 with a selected one or more verified object models. For example, the model comparator 156 can compare molecular properties of the object 106 with those of the verified object models to determine how closely the molecular properties of the object 106 relate to those of similar known objects. Using the gold coin as an example, the model comparator 156 may compare the molecular properties of an unknown gold coin (object 106) with several gold quality or purity models (e.g., models representing molecular properties of different qualities of gold). For example, the model comparator 156 can compare quantum sensor data representing the amount of gold and other impurities in the unknown gold coin with the gold quality models to determine if the unknown gold coin is authentic and, if so, the quality or purity of the gold in the unknown coin. In some implementations, the model comparator 156 employs one or more neural networks 152 to perform the comparison.

Output of the model comparator 156 can include a statistical representation of how close various molecular properties of the object 106 compare to the verified object models. The model comparator 156 can determine the authenticity and/or quality of the object 106 based on the statistical results of the comparison. For instance, an object 106 may be considered authentic if it matches one or more of the verified object models within a threshold value of accuracy. For instance, the model comparator 156 may determine that an object 106 is authentic if its molecular properties are within a 90% match of at least one of the verified object models. Likewise, the model comparator 156 may determine that the quality of the object based on identifying which of the verified object models most closely match the molecular properties of the object 106. Referring again to the gold coin example, the output can include data indicating that the unknown coin has molecular properties that are an 80% match with 24-karat gold, a 90% match with 20-karat gold, and a 70% match with 18-karat gold. Thus, model comparator 156 may determine that the unknown coin is authentic gold and most likely of 20-karat purity because it most closely matches the 20-karat gold model.

Figure 5:
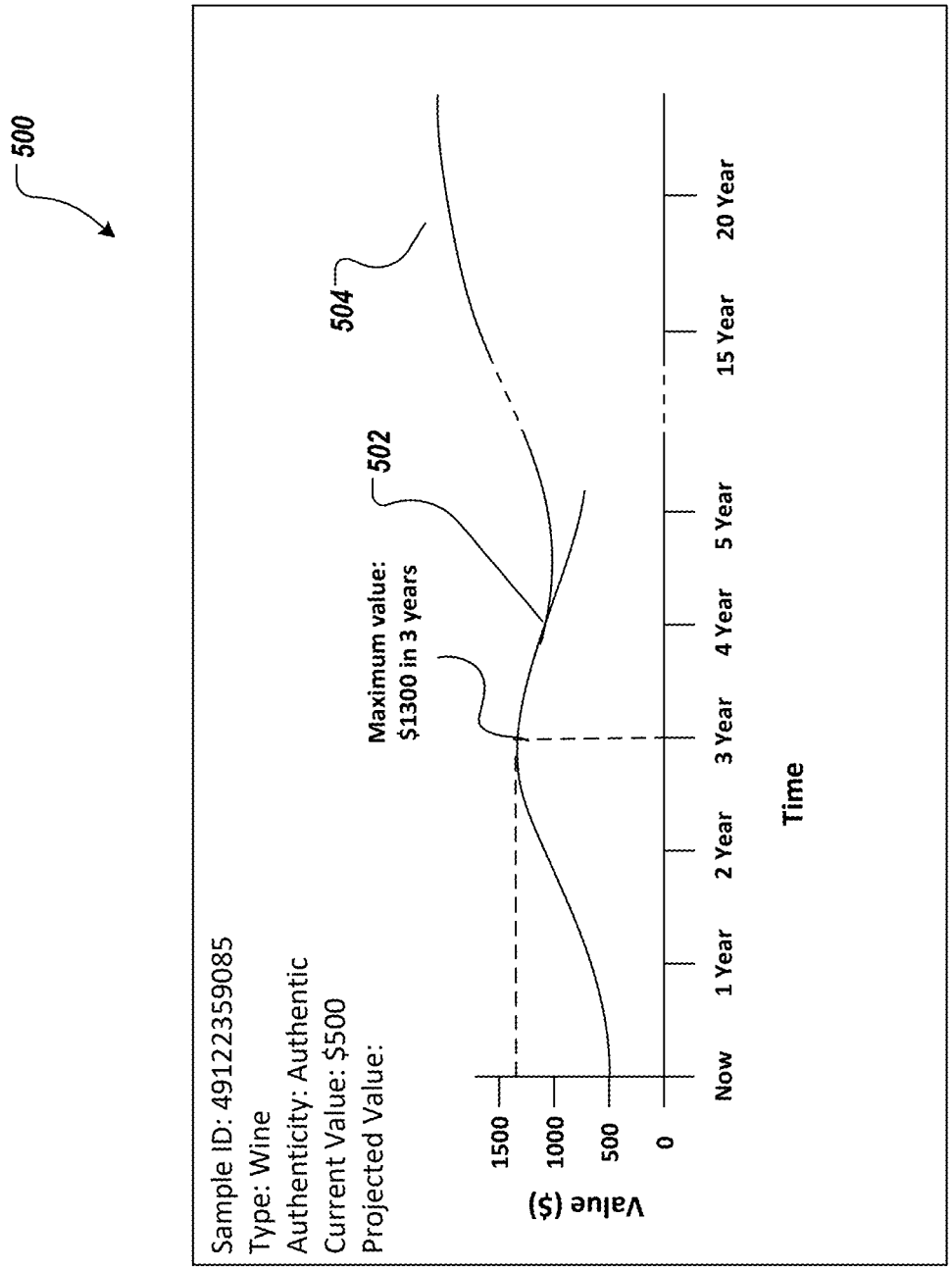
FIG. 5 depicts an example valuation analysis of an object according to implementations of the present disclosure.

Once the authenticity and/or quality of the object 106 has been determined, the server system 104 can provide display data to a computing device 110 to render a graphical display output indicating the determined authenticity and/or quality of the object 106. FIG. 5 illustrates an example of a graphical display 500 for authenticating a bottle of wine. For example, the display data may be sent to a computing device 110 associated with an owner of the object 106. In some implementations, the display data can be sent to a third-party, e.g., an insurance company, an auction house, or a potential purchaser of the object 106. For example, the owner of the object 106 may be seeking valuable property insurance, or offering to sell the object 106 through a dealer or auction house. Therefore, the results of the quantum sensor analysis may be sent provided to an appropriate third party.

In some implementations, the server system 104 can estimate a value of the object 106 based on the results of the quantum sensor analysis. For example, the value estimator 144 employs valuation models in conjunction with the results of the quantum sensor analysis to estimate a present value of the object 106. In some implementations, the value estimator 144 can employ a neural network 152 to perform valuation estimates.

In some implementations, the value estimator 144 selects an appropriate valuation model from among multiple valuation models based on characteristics of the object 106. Such characteristics can include, but are not limited to, the type of object, the quality of the object, the size of the object, the age of the object, and the determined molecular properties of the object. For example, the value estimator 144 may store valuation models specific to valuing different types of precious metals, high quality furs or leather goods, textiles (e.g., tapestries), various types of paintings, different types of gemstones, and different types of wines and liquors.

The value estimator 144 applies the characteristics of the object to the selected valuation model to estimate a current value of the object 106. For example, the value estimator 144 can access current market data through network 107 for objects having similar characteristics. The value estimator 144 can apply a set of interpolation or estimation rules to the characteristics of the object 106 and the market data to obtain an estimated value of the object 106. For example, the molecular properties of the object may indicate the presence or absence of defects in the object 106 which effect its estimated value. In the case of wines and/or liquors, the molecular properties can be evaluated by the valuation model to determine the quality of the beverage compared to expected quality at a given age. For example, if a wine or liquor were stored at an improper temperature the molecular properties may deviate from what would be expected at a given age, therefore, reducing the value.

In addition, the value estimator 144 can employ two different models for beverages: a consumption model and a collectible model. For instance, some beverages are valued differently based on their value for consumption versus their value as a collectible. For instance, FIG. 5 illustrates projected future values of a bottle of wine based on a consumption aging model (plot 502) and based on a collectable aging model (plot 504).

In some examples, the value estimator 144 can project changes in valuation of an object 106 into the future. For example, the value estimator 144 can estimate a change in value for the object 106 at a time in the figure based on market data and the characteristics of the object 106. For example, the value estimator 144 may store multiple aging models for some objects such as wine. Each aging model indicates how a wine of a particular type and with particular molecular properties is expected to age. The value estimator 144 can compare the characteristics, including the molecular properties, of a bottle of wine that has been analyzed by the OCS 102 with one or more of the aging models to estimate a peak value of the wine in the future (e.g., a peak consumption value as shown in plot 502).

In some implementations, the projected value of an object 106 can be estimated by a second quantum sensor scan of the object 106. For example, a second scan can be performed at a later time to determine whether and, in some examples, how the molecular properties of the object 106 may have changed over time. The quantum sensor data from the second scan can be used to create a second molecular model of the object to be compared with the first molecular model (e.g., by the model comparator 156). The model comparator 156 can output any differences in the molecular properties of the object 106 between the two scans. Those differences can be used by the value estimator 144 to re-evaluate the present value of the object 106 and/or estimate a future value. For example, wine will change over time and improve in taste to an extent as it ages. Some factors that contribute to how well a wine ages include, but are not limited to, the wine varietal, the minerals and acids in the wine, and the oxygen content. The change in the molecular content of the wine over time can be compared with an aging model that maps the expected molecular changes for the particular wine varietal over time. If the molecular changes of the subject wine are consistent with expected changes, the value estimator can determine that the wine is aging well and estimate an appropriate value for the wine. However, if the molecular changes of the subject wine are inconsistent with expected changes, the value estimator can determine that the wine is not aging well and reduce the estimated value of the wine based on a measure of how inconsistent the aging is from the expected aging process.

In some implementations, the server system 104 can use the estimated valuation to generate an insurance policy for the object 106. For example, the policy generator 146 can generate a valuable property insurance policy for the object 106 with the estimated valuation as an insured value. The generated policy can then be transmitted to a computing device associated with an owner of the object 106 or an insurance agent. In some examples, the policy generator 146 stores the characteristics of the object association with an insurance profile for the object 106. For example, the policy generator can store information about the object 106 including, the object type, information about the owner, the type of object, the quality of the object, the size of the object, the age of the object, and the determined molecular properties (e.g., the "molecular signature") of the object 106 in association with the policy.

In some implementations, the policy generator 146 can adjust aspects (e.g., premium and insured value) of the policy based on continued monitoring of the object 106. For example, for property such as beverages and some artwork that is susceptible to environmental factors, an owner of the property may employ AMS 120 to provide continual monitoring of the environmental factors where the property (object 106) is stored or displayed. In such implementations, the server system 104 receives environmental data from the AMS 120. The environmental data can be processed by the value estimator 144 to identify whether the owner adversely or favorably stored or maintained the object 106. If the environmental data indicates that an adverse environmental event has occurred, the policy generator 146 may adjust aspects of the policy for the object 106. For example, the policy generator 146 can reduce the insured value of the object 106. In some implementations, the policy generator 146 can send a notification to the owner about the adverse environmental event. The user may then be prompted to correct the adjust storage conditions of the object 106 (e.g., improve humidity, temperature, or lighting control) and/or perform a second quantum analysis of the object 106 to evaluate the actual condition of the object. If so the process described above, can be reperformed on the object 106 and the new quantum measurements can be compared (e.g., by model comparator 156) with the stored molecular signature of the object 106 to detect any changes to the object's condition due to the adverse environmental event. The second analysis may also permit the owner to take quick and appropriate action to repair the object if possible.

In some implementations, the identity of the object 106 can be determined by a subsequent quantum sensor scan. For example, a second scan can be performed at a later time to verify identity of the object 106. The quantum sensor data from the second scan can be used to create a second molecular model of the object 106 to be compared (e.g., by the model comparator 156) with the first molecular model, i.e., the stored copy of the object's molecular signature. The model comparator 156 can output an indication of how closely the second scan data matches the object's molecular signature. If the new scan data matches from the molecular signature by a threshold amount the identity of the object 106 can be confirmed. For example, the model comparator 156 can output a measure of how closely the new scan data matches the object's molecular signature and the server system 104 can confirm the object matches based on the output.

For example, the identity of an unchangeable object, such as a gemstone, can be verified by the above process when an owner submits an insurance claim in order to detect fraud. For instance, if an owner submits a claim for a damaged gemstone, the gemstone in question can be rescanned and compared with its molecular signature. If the subsequent quantum scan data matches the gemstone's molecular signature within in a threshold value (while accounting for the damage), the ident often stone may be verified. For example, if the gemstone was chipped the subsequent scan and comparison with the molecular signature may be performed only on the undamaged portion of the stone.

Figure 2:
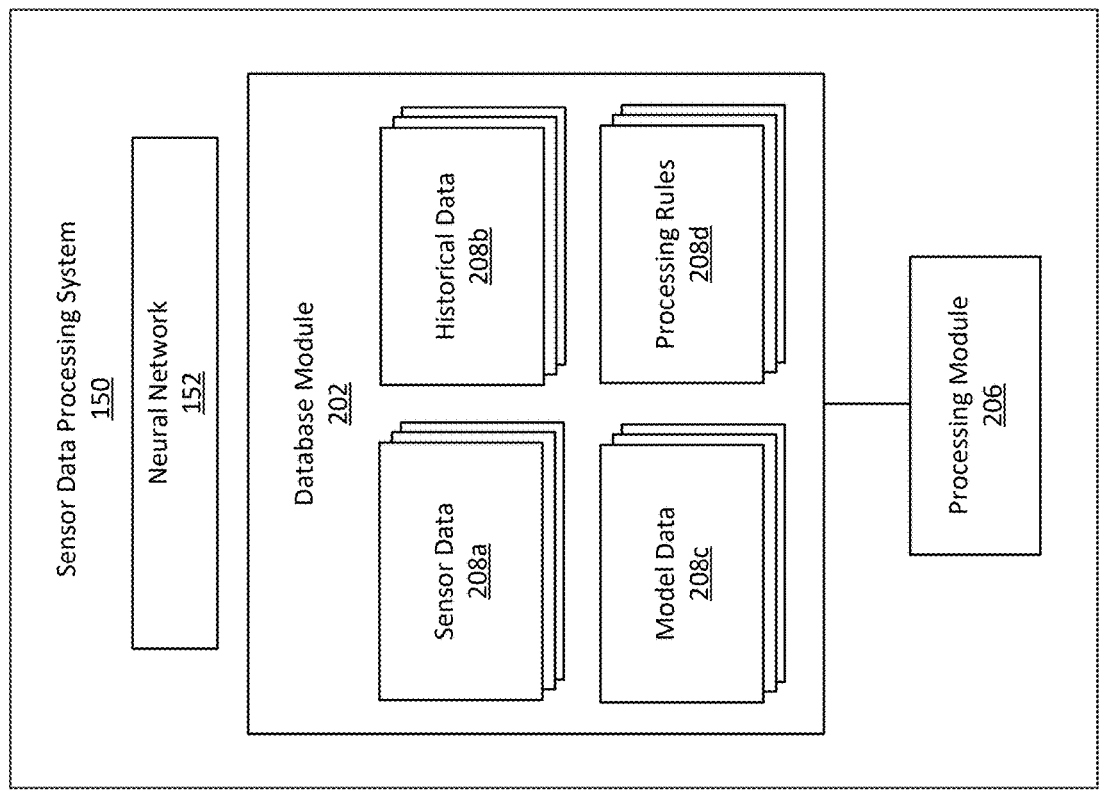
FIG. 2 depicts various aspects of a sensor data processing system.

FIG. 2 shows various aspects of the SDPS 150. The SDPS 150 includes a neural network 152 and several modules that perform particular functions related to the operation of the system 100. For example, the SDPS 150 can include a database module 202, and a processing module 206.

The database module 202 maintains information related to evaluating quantum sensor data and generate molecular models for objects, comparing object molecular models with verified object models, and/or performing valuations of objects based on object characteristics that include the object's molecular model using the neural network 152.

The database module 202 can store training data 208a that is used to train one or more different neural networks 152 to evaluate quantum sensor data to generate molecular models for objects, compare object molecular models with verified object models, and/or perform valuations of objects based on object characteristics that include the object's molecular model. The training data 208a for molecular model generation can include historical information regarding one or more sets of quantum sensor data, which can be used to train the neural network 152 to recognize particular trends, patterns, or correlations between quantum sensor data and molecular properties of objects. The training data 208a for model comparisons can include sets of known molecular models for comparison, which can be used to train the neural network 152 to recognize particular correlations and differences between molecular models of different objects or between a subsequent molecular model of an object and its prior molecular signature, e.g., for verification purposes. The training data 208a for value estimation can include historical information regarding value trends for objects and their molecular properties, which can be used to train the neural network 152 to recognize particular trends, patterns, or correlations between value and object molecular properties.

Further, the database module 202 can store quantum sensor data 208b, models of various objects that have been evaluated, molecular signatures of objects, and verified object models of known objects. The stored data can be used by the neural network 152 of the SDPS 150 to perform any of the above analyses of the object.

Further, the database module 202 can store processing rules 208c specifying how data in the database module 202 can be processed to train a neural network(s) 152 to evaluate quantum sensor data and generate molecular models for objects, compare object molecular models with verified object models, and/or perform valuations of objects based on object characteristics that include the object's molecular model. For instance, the processing rules 208c can specify that the training data 208a can be used by the SDPS 150 to train a neural network(s) 152 to evaluate quantum sensor data and generate molecular models for objects, compare molecular models of objects with verified object models, and/or perform valuations of objects based on object characteristics that include the object's molecular model.

For example, the processing rules 208c can specify one more machine learning or artificial intelligence processes for identifying patterns, trends, or correlations in input data that are indicative of molecular properties of different objects. As another example, the processing rules 208c can specify that at least a portion of the training data 208a be used as input data in the machine learning or artificial intelligence processes (for example, to provide "ground truth" examples that can aid in the identification of patterns or trends). Accordingly, the SDPS 150 can be trained to identify molecular properties based on spectral and intensity data measured by the quantum sensors and/or based on positioning of the sensors (e.g., the data tags described above). In some implementations, the processing rules 208c can specify that the neural network 152 be iteratively trained and re-trained with successive sets of training data 208a (for example, additional sets of training data 208a that are collected over time) to progressively improve its accuracy in identifying molecular properties of objects. In some implementations, the processing rules 208c can specify that a training process be performed automatically by the SDPS 150 without manual user input.

As another example, the processing rules 208c can specify that the neural network 152 generate, for each of several molecular properties, model comparison results, or value estimations; one or more respective quality metrics that indicate an estimated likelihood that the molecular properties, model comparison results, or value estimations are correct. As an example, if the quality metric for a particular molecular property, model comparison result, or value estimation is relatively high, this can indicate that that molecular properties, model comparison results, or value estimations is more likely to be correct. Conversely, if the quality metric for a particular molecular property, model comparison result, or value estimation is relatively lower, this can indicate that that the molecular property, model comparison result, or value estimation is less likely to be correct.

Example machine learning or artificial intelligence process are described in further detail below.

In some implementation, the processing rules 208c can specify that the neural network 152 automatically select, from among the multiple molecular properties, model comparison results, or value estimations; a particular molecular property, model comparison result, or value estimation. For example, the processing rules 208c can specify that the molecular property, model comparison result, or value estimation having the highest quality metric be automatically selected.

As described above, the SDPS 150 also includes a processing module 206. The processing module 206 processes data stored or otherwise accessible to the SDPS 150. For instance, the processing module 206 can generate the neural network 152 to evaluate quantum sensor data and generate molecular models for objects, compare object molecular models with verified object models, and/or perform valuations of objects based on object characteristics, given particular training data 208a and processing rules 208c. Further, the processing module 206 can determine an estimated likelihood that each molecular property, model comparison result, or value estimation is correct, given particular quantum sensor data 208b.

Further, the processing module 206 can modify the neural network 152 based the training data 208a and the processing rules 208c. For example, as described above, the processing module 206 can perform one or more machine learning or artificial intelligence processes to identify patterns, trends, or correlations in input data that are indicative of molecular properties, model comparison results, or value estimations. The identified patterns, trends, or correlations can be used to generate or modify one or more of the processing rules 208c for generating and updating the neural network 152 (for example, to distinguish between different molecular properties, model comparison results, or value estimations). Further, as described above, at least a portion of the training data 208a can be used as input data in the machine learning or artificial intelligence processes. Further, as described above, the processing module 206 can perform the training processes iteratively using successive sets of training data 208a to progressively improve the neural network's accuracy in generating molecular models for objects, comparing object molecular models with verified object models, and/or performing valuations of objects based on object characteristics. In some implementations, this training process can be performed automatically by the processing module 206 without manual user input.

Figure 3:
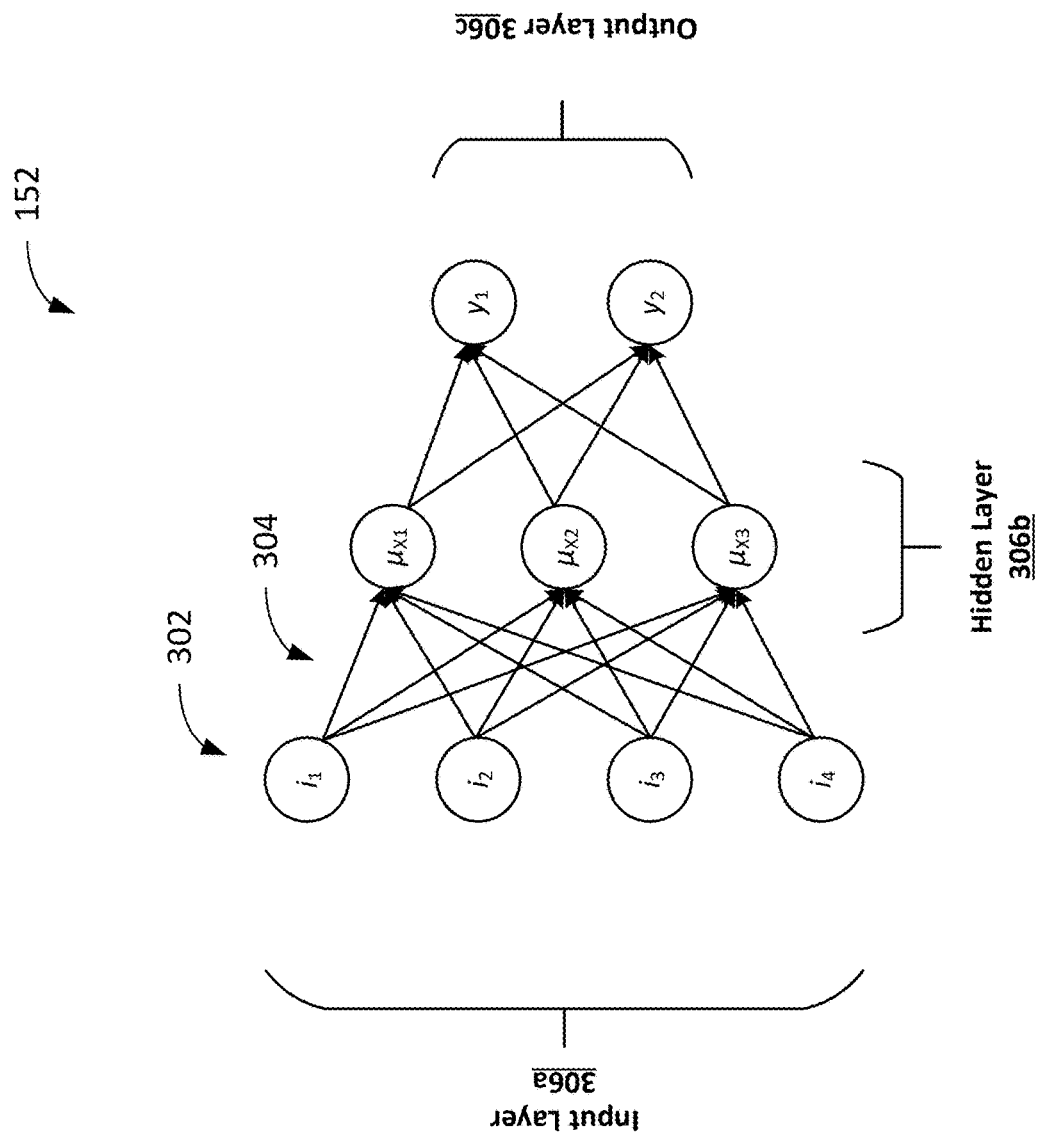
FIG. 3 illustrates a simplified example of a neural network.

As described above, a machine learning or particular intelligence process can be performed using one or more neural networks 152. A simplified example of a neural network 152 is shown in FIG. 3.

The neural network 152 includes several nodes 302 (often called "neurons") interconnected with another by interconnections 304. Further, the nodes 302 are arranged according to multiple layers, including an input layer 306a, a hidden layer 306b, and an output layer 306c. The arrangement of the nodes 302 and the interconnections 304 between them represent a mathematical transformation of input data (for example, as received by the nodes of the input layer 306a) into corresponding output data (for example, as output by the nodes of the output layer 306c). In some implementations, the input data can represent one or more data points obtained by the SDPS 150, and the output data can represent one or more corresponding outcomes or decisions generated by the SDPS 150 based on the input data.

The nodes 302 of the input layer 306a receive input values and output the received input values to respective nodes of the next layer of the neural network 152. In this example, the neural network 152 includes several inputs $i_1$, $i_2$, $i_3$, and $i_4$, each of which receives a respective input value and outputs the received value to one or more of the nodes $\mu_{x1}$, $\mu_{x2}$, and $\mu_{x3}$ (for example, as indicated by the interconnections 304).

In some implementations, at least some of the information stored by the database module (for example, the quantum sensor data 208b) can be used as inputs for the nodes of the input layer 306a. For example, at least some of the information stored by the database module can be expressed numerically (for example, assigned a numerical score or value), and input into the nodes of the input layer 306a.

The nodes of the hidden layer 306b receive input values (for example, from the nodes of the input layer 306a or nodes of other hidden layers), applies particular transformations to the received values, and outputs the transformed values to respective nodes of the next layer of the neural network 152 (for example, as indicated by the interconnections 304). In this example, the neural network 152 includes several nodes $\mu_{x1}$, $\mu_{x2}$, and $\mu_{x3}$, each of which receives respective input values from the nodes $i_1$, $i_2$, $i_3$, and $i_4$, applies a respective transformation to the received values, and outputs the transformed values to one or more of the nodes $y_1$ and $y_2$.

In some implementations, nodes of the hidden layer 306b can receive one or more input values, and transform the one or more received values according to a mathematical transfer function. As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, a transfer function can weight certain inputs differently than others, such that certain inputs have a greater influence on the output of the node than others. For example, in some implementations, a transfer function can weight each of the inputs by multiplying each of the inputs by a respective coefficient. Further, in some implementations, a transfer function can apply a bias to its output. For example, in some implementations, a transfer function can bias its output by a particular offset value.

For instance, a transfer function of a particular node can be represented as:

$$Y = \sum_{i=1}^{n} (\text{weight}_i * \text{input}_i) + \text{bias},$$

where $\text{weight}_i$ is the weight that is applied to an input $\text{input}_i$, bias is a bias or offset value is that is applied to the sum of the weighted inputs, and Y is the output of the node.

The nodes of the output layer 306c receive input values (for example from the nodes of the hidden layer 306b) and output the received values. In some implementations, nodes of the output layer 306c can also receive one or more input values, and transform the one or more received values according to a mathematical transfer function (for example, in a similar manner as the nodes of the hidden layer 306b). As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, each of the nodes of the output layer 306c can correspond to a molecular property, model comparison result, or value estimation; and can output a respective quality metric that indicates an estimated likelihood that the molecular property, model comparison result, or value estimation is correct. As an example, if the quality metric that is output by a node for a molecular property, is relatively high, this can indicate that that molecular property is more likely to be correct. Conversely, if the quality metric that is output by a node for a particular molecular property is relatively lower, this can indicate that that the molecular property is less likely to be correct.

In this example, the neural network 152 includes two output nodes $y_1$ and $y_2$, each of which receives respective input values from the nodes $\mu_{x1}$, $\mu_{x2}$, and $\mu_{x3}$, applies a respective transformation to the received values, and outputs the transformed values as outputs of the neural network 152.

Although FIG. 3 shows example nodes and example interconnections between them, this is merely an illustrative example. In practice, a neural network can include any number of nodes that are interconnected according to any arrangement. Further, although FIG. 3 shows a neural network 152 having a single hidden layer 306b, in practice, a network can include any number of hidden layers (for example, one, two, three, four, or more), or none at all.

Figure 4:
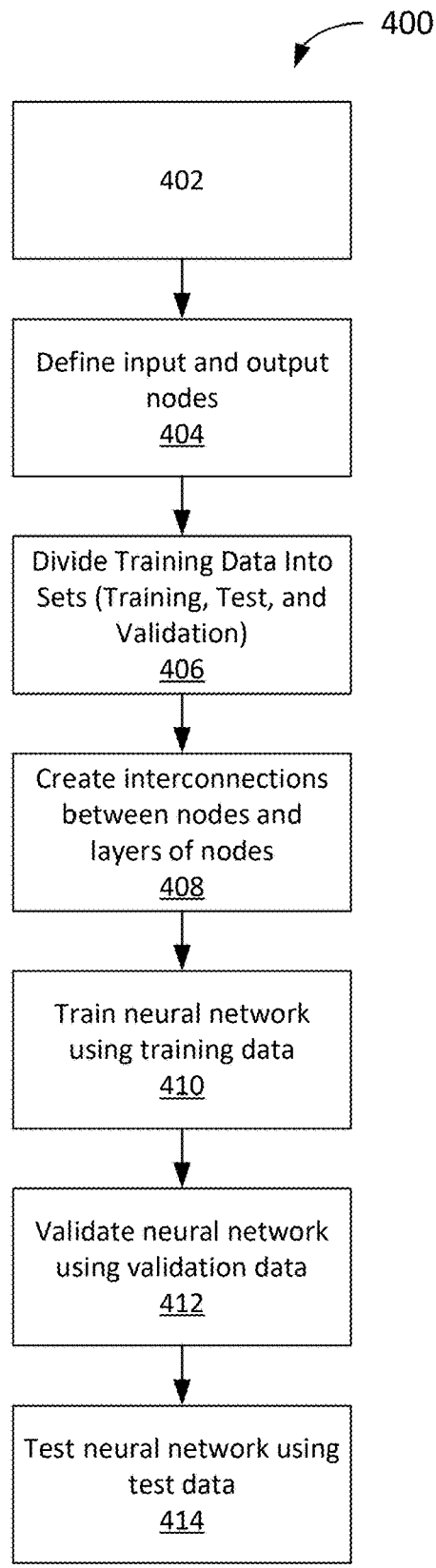
FIG. 4 depicts a flow diagram of an example process training a neural network.

In some implementations, the neural network 152 can be trained based on training data, such as the training data 208a stored in the database module 202. An example process 400 for training the neural network 152 is shown in FIG. 4.

According to the process 400, the SDPS 150 initializes the input data that is used to train the neural network 152 (block 402). As an example, the SDPS 150 can retrieve at least a portion of the training data 208a, as described above.

Further, the SDPS 150 defines the input and the output nodes of the neural network 152 (block 404). For example, the SDPS 150 can select one or more of the types of data include in the training data 208a (for example, as described above), and specify that they be used as respective input nodes in the neural network 152 (for example, as inputs for respective nodes of the input layer 306a. As another example, the SDPS 150 can specify each of the outputs of the neural network (for example, the outputs of each of the nodes of the output layer 306c). For instance, each of the nodes of the output layer 306c can correspond to a different molecular properties, model comparison results, or value estimations, and can output a respective quality metric that indicates an estimated likelihood that that the respective molecular property, model comparison result, or value estimation is correct.

The SDPS 150 divides the training data 208a into different sets (block 406). For example, the training data 208a can be divided into a training set, a validation set, and a test set.

The training set can be used to train the neural network 152. For example, the training set can be used to identify patterns, trends, or correlations between the inputs and the outputs of the neural network 152, and to express those relationships using the nodes and interconnections between them.

The validation set can be used to tune the performance of the trained neural network 152. For example, the validation set can be used to determine a difference between the output of the neural network 152 given certain inputs, and an expected output. The configuration of the neural network can be modified based on the different (for example, such that the output of the neural network 152 better matches the expected result).

The test set can be used to evaluate the performance of the trained neural network 152 (for instance, after it has been tuned based on the validation set). For example, the test set can be used to determine a difference between the output of the neural network 152 given certain inputs, and an expected output. This difference can indicate the ability of the neural network 152 to accurately predict a particular outcome (e.g., the likelihood that a particular molecular property) is correct given particular inputs (e.g., quantum sensor data).

Further, the SDPS 150 creates interconnections between the nodes and layers of nodes in of the neural network 152. In some implementations, an interconnection between two or more nodes can be in the forward direction (for example, data can be passed between nodes in the direction of the input to the output of the neural network 152). This may be referred to as a "feed forward" interconnection. In some implementations, an interconnection between two or more nodes can be in the backward direction (for example, data can be passed between nodes in the direction of the output to the input of the neural network 152). This may be referred to as a "back propagation" interconnection.

Further, the SDPS 150 creates layers of nodes. For example, the SDPS 150 can specify that the neural network include N layers of nodes, such as one input layer, one output layer, and N−2 hidden layers. Other arrangements of layers are also possible, depending on the implementation.

Further, the SDPS 150 trains the neural network 152 using the training set (block 410). In some implementations, the SDPS 150 to perform the training based on a supervised learning method. As an example, the training set can include example input data and output data. Based on the arrangement of the nodes and the interconnections between them, the SDPS 150 can identify transfer functions for each of the nodes that would result in the output of the neural network 152 matching or otherwise being similar to the output data in the training set, given the same input data. In some implementations, the SDPS 150 can select particular weights or biases for each of the transfer functions. In some implementations, this can be performed iteratively (for example, using successive sets of training data).

After training the neural network 152, the SDPS 150 validates the neural network 152 using the validation set (block 412). As an example, the validation set can include example input data and output data. The SDPS 150 can input the input data into the neural network 152, and compare the output of the neural network 152 to the output data of the validation set. In some implementations, the SDPS 150 can calculate an "error" of the neural network 152, such as the difference between the output data of the validation set and the output of the neural network 152.

In some implementations, the SDPS 150 can tune the neural network 152 based on the validation set. For example, the SDPS 150 can modify the arrangement of the nodes, the interconnections between them, and/or the transfer functions (for example, the weights and biases) such that the error of the neural network 152 is reduced.

In some implementations, this can be performed iteratively (for example, using successive sets of validation data) until particular criteria are met. For example, in some implementations, the SDPS 150 can iteratively tune the neural network 152 until the error of the neural network 152 is less than a particular threshold value.

After training and tuning the neural network 152, the SDPS 150 tests the neural network 152 using the test set (block 414). As an example, the test set can include example input data and output data. The SDPS 150 can input the input data into the neural network 152, and compare the output of the neural network 152 to the output data of the test set. In some implementations, the SDPS 150 can calculate an "error" of the neural network 152, such as the difference between the output data of the test set and the output of the neural network 152. This error can represent the predictive performance of the neural network. For example, a high error can indicate that the neural network 152 is less likely to predict an outcome accurately, given certain input data. Conversely, lower error can indicate that the neural network 152 is more likely to predict an outcome accurately, given certain input data.

Figure 7:
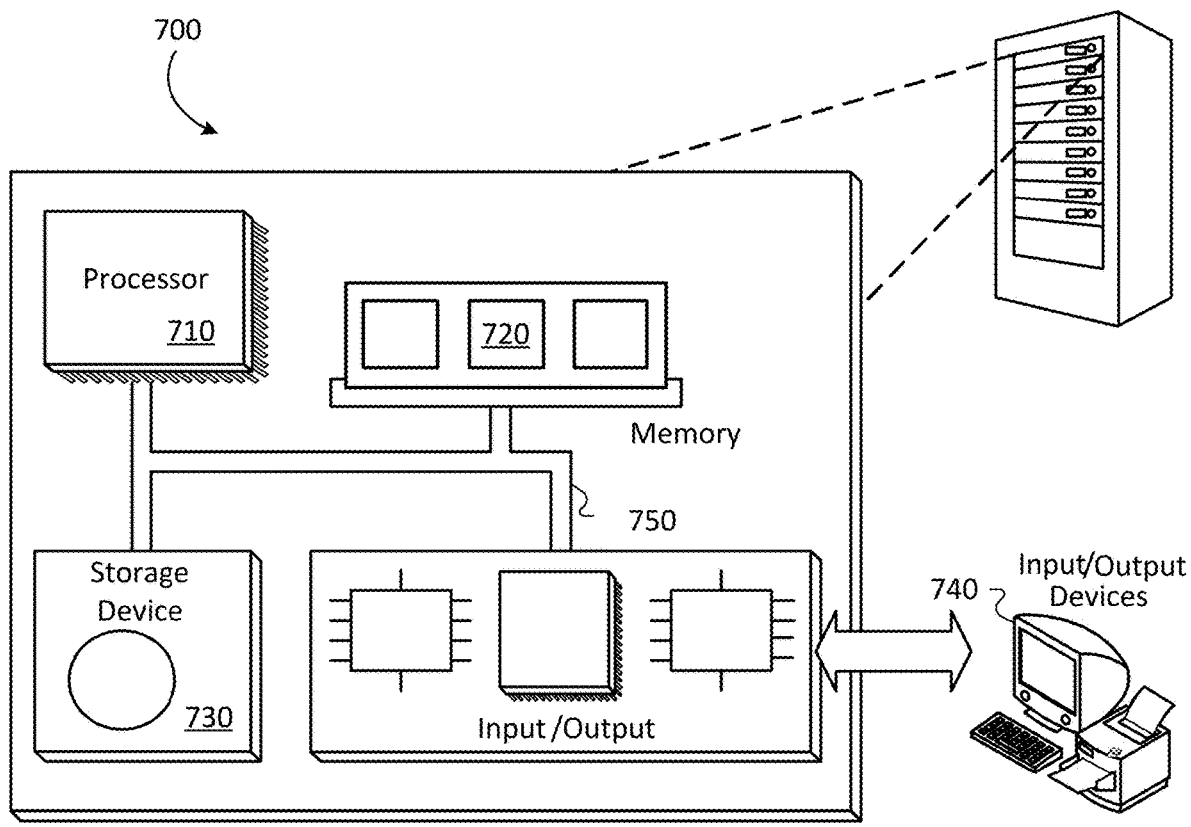
FIG. 7 depicts a schematic diagram of a computer system that may be applied to any of the computer-implemented methods and other techniques described herein.

FIG. 7 is a schematic diagram of a computer system 700. The system 700 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 700) and their structural equivalents, or in combinations of one or more of them. The system 700 is intended to include various forms of digital computers, such as laptops, desktops, workstations, personal digital assistants, servers, blade servers, mainframes, and other appropriate computers, including vehicles installed on base units or pod units of modular vehicles. The system 700 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transducer or USB connector that may be inserted into a USB port of another computing device.

The system 700 includes a processor 710, a memory 720, a storage device 730, and an input/output device 840. Each of the components 710, 720, 730, and 840 are interconnected using a system bus 850. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 840.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 840 provides input/output operations for the system 700. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

Although the disclosed inventive concepts include those defined in the attached claims, it should be understood that the inventive concepts can also be defined in accordance with the following embodiments.

In addition to the embodiments of the attached claims and the embodiments described above, the following numbered embodiments are also innovative.

Embodiment 1 is a system, the system includes a sensor system and a computer system. The sensor system includes one or quantum sensors, wherein the sensor systems is configured to generate first sensor data representing one or more molecular properties of a first object at a first time. The computer system includes one or more processors, wherein the computer system is configured to: receive the first sensor data from the sensor system; obtain model data representing one or more molecular properties of a model object; generate, based on the first sensor data and the model data, a comparison between the one or more molecular properties of the first object at the first time and the one or more molecular properties of the model object; determine an authenticity of the first object based on the comparison; and cause a graphical user interface indicating the authenticity of the first object to be displayed on a display device.

Embodiment 1 may provide one or more of the following technical advantages or effects: the embodiments may improve the grading precision for certain types of property such as jewelry, gemstones, and precious metals. Embodiments may increase the accuracy of verifying authenticity for more complex types of property such as fine wines and liquors by evaluation at the molecular level. Furthermore, embodiments may permit quality testing of liquids without the need to open the bottles to test the content, as, e.g., quantum sensor analysis could be performed through the bottle.

Embodiment 2 is the system of embodiment 1, wherein the one or molecular properties of the first object at the first time comprise at least one of: a molecular composition of the first object at the first time, or a crystal structure of the first object at the first time.

Embodiment 3 is the system of embodiment 2, wherein the one or molecular properties of the model object comprise at least one of: a molecular composition of the model object, or a crystal structure of the model object.

Embodiment 4 is the system of any one of embodiments 2 or 3, further comprising a second sensor system configured to monitor an environment of the first object and generate second sensor data representing one or more properties the an environment of the first object.

Embodiment 5 is the system of embodiment 4, wherein the one or more properties of an environment of the first object comprise at least one of: an amount of light in the environment, a humidity of the environment, a temperature of the environment, or an amount of air pollution in the environment.

Embodiment 6 is the system of any one of embodiments 1 through 5, wherein the one or more quantum sensors are configured to: receive radiation samples from the first object at the first time; and determine a spectral composition of the radiation samples.

Embodiment 7 is the system of any one of embodiments 1 through 6, wherein the first object is at least one of: a beverage, a gemstone, an item of jewelry, a precious metal, an item of art, a collectable item, or an item of clothing.

Embodiment 8 is the system of any one of embodiments 1 through 7, wherein the computer system is configured to: determine, based on the first sensor data, a first molecular signature uniquely identifying the first object from among a plurality of other objects at the first time, and store the first molecular signature in association with an insurance profile of the first object.

Embodiment 9 is the system of any one of embodiments 1 through 8, wherein the sensor system is configured to generate second sensor data representing one or more properties of the first object at a second time, and wherein the computer system is configured to generate, based on the first sensor data and the third sensor data, a comparison between the one or more molecular properties of the first object at the first time and the one or more molecular properties of the first object at the second time.

Embodiment 10 is the system of embodiment 9, wherein the computer system is configured to: estimate a change in value of the first object at the second time based on the comparison between the one or more molecular properties of the first object at the first time and the one or more molecular properties of the first object at the second time.

Embodiment 11 is the system of any one of embodiments 9 or 10, wherein the computer system is configured to: estimate a change in value of the first object at a third time based on the comparison between the one or more molecular properties of the first object at the first time and the one or more molecular properties of the first object at the second time, wherein the third time is subsequent to the first time and the second time.

Embodiment 12 is the system of any one of embodiments 9 through 11, wherein the computer system is configured to: select, based on the comparison between the one or more molecular properties of the first object at the first time and the one or more molecular properties of the first object at the second time, a valuation model from among multiple valuation models; estimate, based on the selected valuation model and the comparison between the one or more molecular properties of the first object at the first time and the one or more molecular properties of the first object at the second time, that a value of the first object will be greatest at a third time, wherein the third time is subsequent to the first time and the second time.

Embodiment 13 is the system of any one of embodiments 9 through 12, wherein the computer system is configured to: determine, based on the comparison between the one or more molecular properties of the first object at the first time and the one or more molecular properties of the first object at the second time, that the first object had been altered between the first time and the second time.

Embodiment 14 is the system of embodiment 13, wherein determining that the first object had been altered comprises at least one of: determining that the first object had been damaged between the first time and the second time, or determining that a portion of the first object had been replaced between the first time and the second time.

Embodiment 15 is the system of any one of embodiments 1 through 14, wherein the computer system is configured to: determine, based on the authenticity of the first object, one or more financial products for a user associated with the first object, and cause the one or more financial products to be indicated on the graphical user interface.

Embodiment 16 is the system of any one of embodiments 1 through 15, where the sensor system comprises: a plurality of quantum sensors; and one or more radiation emitters, each configured to emit electromagnetic radiation in a different frequency band.

Embodiment 17 is the system of embodiment 16, wherein at least one of the quantum sensors comprises: a radiation detector; and a signal processor.

Embodiment 18 is the system of embodiment 17, wherein the signal processor is configured to generate a sensor output signal indicating an intensity and a frequency of electromagnetic radiation detected by the associated radiation detector, and wherein the sensor output signal is included in the first sensor data.

Embodiment 19 is the system of any one of embodiments 1 through 18, wherein the first sensor data includes data tags indicating characteristics associated with the data.

Embodiment 20 is the system of embodiment 19, wherein the data tags indicate at least one of a sensor position data, measurement time data, spectral frequency data.

Embodiment 21 is a method that includes: receiving first sensor data from a sensor system comprising one or more quantum sensors, wherein the first sensor data represents one or more molecular properties of a first object at a first time; obtaining model data representing one or more molecular properties of a model object; generating, based on the first sensor data and the model data, a comparison between the one or more molecular properties of the first object at the first time and the one or more molecular properties of the model object; determining an authenticity of the first object based on the comparison; and causing a graphical user interface indicating the authenticity of the first object to be displayed on a display device.

Embodiment 22 is the method of embodiment 21, wherein the one or molecular properties of the first object at the first time comprise at least one of: a molecular composition of the first object at the first time, or a crystal structure of the first object at the first time.

Embodiment 23 is the method of embodiment 22, wherein the one or molecular properties of the model object comprise at least one of: a molecular composition of the model object, or a crystal structure of the model object.

Embodiment 24 is the method of any one of embodiments 22 or 23, further comprising receiving, from a second sensor system configured to monitor an environment of the first object, second sensor data representing one or more properties the an environment of the first object.

Embodiment 25 is the method of embodiment 24, wherein the one or more properties of an environment of the first object comprise at least one of: an amount of light in the environment, a humidity of the environment, a temperature of the environment, or an amount of air pollution in the environment.

Embodiment 26 is the method of any one of embodiments 21 through 25, wherein the one or more quantum sensors are configured to: receive radiation samples from the first object at the first time; and determine a spectral composition of the radiation samples.

Embodiment 27 is the method of any one of embodiments 21 through 26, wherein the first object is at least one of: a beverage, a gemstone, an item of jewelry, a precious metal, an item of art, a collectable item, or an item of clothing.

Embodiment 28 is the method of any one of embodiments 21 through 27, further comprising: determining, based on the first sensor data, a first molecular signature uniquely identifying the first object from among a plurality of other objects at the first time, and storing the first molecular signature in association with an insurance profile of the first object.

Embodiment 29 is the method of any one of embodiments 21 through 28, further comprising receiving, from the sensor system, second sensor data representing one or more properties of the first object at a second time; and generating, based on the first sensor data and the third sensor data, a comparison between the one or more molecular properties of the first object at the first time and the one or more molecular properties of the first object at the second time.

Embodiment 30 is the method of embodiment 29, further comprising estimating a change in value of the first object at the second time based on the comparison between the one or more molecular properties of the first object at the first time and the one or more molecular properties of the first object at the second time.

Embodiment 31 is the method of any one of embodiments 29 or 30, further comprising estimate a changing in value of the first object at a third time based on the comparison between the one or more molecular properties of the first object at the first time and the one or more molecular properties of the first object at the second time, wherein the third time is subsequent to the first time and the second time.

Embodiment 32 is the method of any one of embodiments 29 through 31, further comprising: selecting, based on the comparison between the one or more molecular properties of the first object at the first time and the one or more molecular properties of the first object at the second time, a valuation model from among multiple valuation models; estimating, based on the selected valuation model and the comparison between the one or more molecular properties of the first object at the first time and the one or more molecular properties of the first object at the second time, that a value of the first object will be greatest at a third time, wherein the third time is subsequent to the first time and the second time.

Embodiment 33 is the method of any one of embodiments 29 through 32, further comprising: determining, based on the comparison between the one or more molecular properties of the first object at the first time and the one or more molecular properties of the first object at the second time, that the first object had been altered between the first time and the second time.

Embodiment 34 is the method of embodiment 33, wherein determining that the first object had been altered comprises at least one of: determining that the first object had been damaged between the first time and the second time, or determining that a portion of the first object had been replaced between the first time and the second time.

Embodiment 35 is the method of any one of embodiments 21 through 34, further comprising: determining, based on the authenticity of the first object, one or more financial products for a user associated with the first object, and cause the one or more financial products to be indicated on the graphical user interface.

Embodiment 36 is the method of any one of embodiments 21 through 35, where the sensor system comprises: a plurality of quantum sensors; and one or more radiation emitters, each configured to emit electromagnetic radiation in a different frequency band.

Embodiment 37 is the method of embodiment 36, wherein at least one of the quantum sensors comprises: a radiation detector; and a signal processor.

Embodiment 38 is the method of embodiment 37, wherein the signal processor is configured to generate a sensor output signal indicating an intensity and a frequency of electromagnetic radiation detected by the associated radiation detector, and wherein the sensor output signal is included in the first sensor data.

Embodiment 39 is the method of any one of embodiments 21 through 38, wherein the first sensor data includes data tags indicating characteristics associated with the data.

Embodiment 40 is the method of embodiment 39, wherein the data tags indicate at least one of a sensor position data, measurement time data, spectral frequency data.

Embodiment 31 is a computer storage medium encoded with a computer program, the program comprising instructions that are operable, when executed by data processing apparatus, to cause the data processing apparatus to perform the method of any one of embodiments 21 to 40.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A system comprising:
a sensor system comprising:
one or more radiation emitters, each configured to emit electromagnetic radiation in a different frequency band, and
one or more sensors, each sensor tuned to measure electromagnetic radiation in a particular frequency band, wherein the sensor system is configured to generate first sensor data representing measurements of a physical object by the sensors at a first time, wherein at least one sensor is configured to generate a sensor output signal indicating an intensity and a frequency of electromagnetic radiation detected by an associated radiation detector, and wherein the sensor output signal is included in the first sensor data; and
a computer system comprising one or more processors, wherein the computer system is configured to:
control the sensor system to emit electromagnetic radiation;
receive the first sensor data from the sensor system, wherein the first sensor data includes data tags indicating characteristics associated with the data, and wherein the data tags indicate at least one of a sensor position data, measurement time data, spectral frequency data;
determine, using the one or more processors, molecular properties of the physical object by applying the sensor data as input to a machine learning algorithm trained to correlate patterns of electromagnetic intensity and frequency measurements from the sensors with molecular compositions from a library of known radiation patters for elements and molecules;
store, in a memory of the computer system, the molecular properties of the physical object and the sensor data as a signature of the physical object;
obtain, from the memory of the computer system, test model data representing one or more molecular properties of a test model object;
generate, using the one or more processors and based on the first sensor data and the test model data, a comparison between the molecular properties of the physical object at the first time and the one or more molecular properties of the test model object;
determine an authenticity of the physical object based on the comparison;
cause a graphical user interface indicating the authenticity of the physical object to be displayed on a display device; and
adjusting, by a policy generator, an insurance policy associated with the physical object.

2. The system of claim 1, wherein the one or molecular properties of the physical object at the first time comprise at least one of:

a molecular composition of the physical object at the first time, or a crystal structure of the physical object at the first time.

3. The system of claim 2, wherein the one or molecular properties of the model object comprise at least one of:
   a molecular composition of the model object, or
   a crystal structure of the model object.

4. The system of claim 2, further comprising a second sensor system configured to monitor an environment of the physical object and generate second sensor data representing one or more properties the environment of the physical object.

5. The system of claim 4, wherein the one or more properties of an environment of the physical object comprise at least one of:
   an amount of light in the environment,
   a humidity of the environment,
   a temperature of the environment, or
   an amount of air pollution in the environment.

6. The system of claim 1, wherein the physical object is at least one of:
   a gemstone,
   an item of jewelry, or
   a precious metal.

7. The system of claim 1, wherein the computer system is configured to:
   determine, based on the first sensor data, a first molecular signature uniquely identifying the physical object from among a plurality of other objects at the first time, and
   store the first molecular signature in association with an insurance profile of the physical object.

8. The system of claim 1, wherein the sensor system is configured to generate second sensor data representing one or more properties of the physical object at a second time, and
   wherein the computer system is configured to generate, based on the first sensor data and the second sensor data, a comparison between the one or more molecular properties of the physical object at the first time and the one or more molecular properties of the physical object at the second time.

9. The system of claim 8, wherein the computer system is configured to:
   estimate a change in value of the physical object at the second time based on the comparison between the one or more molecular properties of the physical object at the first time and the one or more molecular properties of the physical object at the second time.

10. The system of claim 8, wherein the computer system is configured to:
    estimate a change in value of the physical object at a third time based on the comparison between the one or more molecular properties of the physical object at the first time and the one or more molecular properties of the physical object at the second time, wherein the third time is subsequent to the first time and the second time.

11. The system of claim 8, wherein the computer system is configured to:
    select, based on the comparison between the one or more molecular properties of the physical object at the first time and the one or more molecular properties of the physical object at the second time, a valuation model from among multiple valuation models; and
    estimate, based on the selected valuation model and the comparison between the one or more molecular properties of the physical object at the first time and the one or more molecular properties of the physical object at the second time, that a value of the physical object will be greatest at a third time, wherein the third time is subsequent to the first time and the second time.

12. The system of claim 8, wherein the computer system is configured to:
    determine, based on the comparison between the one or more molecular properties of the physical object at the first time and the one or more molecular properties of the physical object at the second time, that the physical object had been altered between the first time and the second time.

13. The system of claim 12, wherein determining that the physical object had been altered comprises at least one of:
    determining that the physical object had been damaged between the first time and the second time, or
    determining that a portion of the physical object had been replaced between the first time and the second time.

14. The system of claim 1, wherein the computer system is configured to:
    determine, based on the authenticity of the physical object, one or more financial products for a user associated with the physical object, and
    cause the one or more financial products to be indicated on the graphical user interface.

15. The system of claim 1, wherein at least one of the sensors comprises:
    a radiation detector; and
    a signal processor.

16. A system comprising:
    a sensor system comprising sensors, wherein the sensor systems is configured to generate sensor data representing one or more molecular properties of a physical object, the sensor system comprising:
      a plurality of sensors, each tuned to measure electromagnetic radiation in a particular frequency band;
      one or more radiation emitters, each configured to emit electromagnetic radiation in a different frequency band towards the physical object;
      one or more signal processors configured to generate sensor data indicating an intensity and a frequency of electromagnetic radiation detected by an associated detector; and
      a network interface configured to transmit the sensor data to computing systems;
    a computer system comprising one or more processors, wherein the computer system is configured to:
      control the sensor system to emit electromagnetic radiation;
      receive the sensor data from the sensor system;
      determine, using the one or more processors, molecular properties of the physical object by applying the sensor data as input to a machine learning algorithm trained to correlate patterns of electromagnetic intensity and frequency measurements from the sensors with molecular compositions from a library of known radiation patters for elements and molecules;
      store, in a memory of the computer system, the molecular properties of the physical object and the sensor data as a signature of the physical object;
      obtain, from the memory of the computer system, test model data representing one or more molecular properties of a test model object;
      generate, using the one or more processors and based on the sensor data and the test model data, a comparison between the molecular properties of the physical object and the one or more molecular properties of the test model object, the comparison comprising a statistical representation of how closely the molecular properties of the physical object compare with molecular properties of the test model object contained in the test model data; and determine an authenticity of the physical object based whether the statistical representation indicates a molecular match greater than or equal to a predefined threshold value;

automatically generate, based at least in part on the authenticity of the physical object, an insurance policy for physical object;

send the insurance policy to a computing device associated with an insurance agent or owner of the physical object; and adjusting, by a policy generator, an insurance policy associated with the physical object.

* * * * *